Patented Sept. 20, 1927.

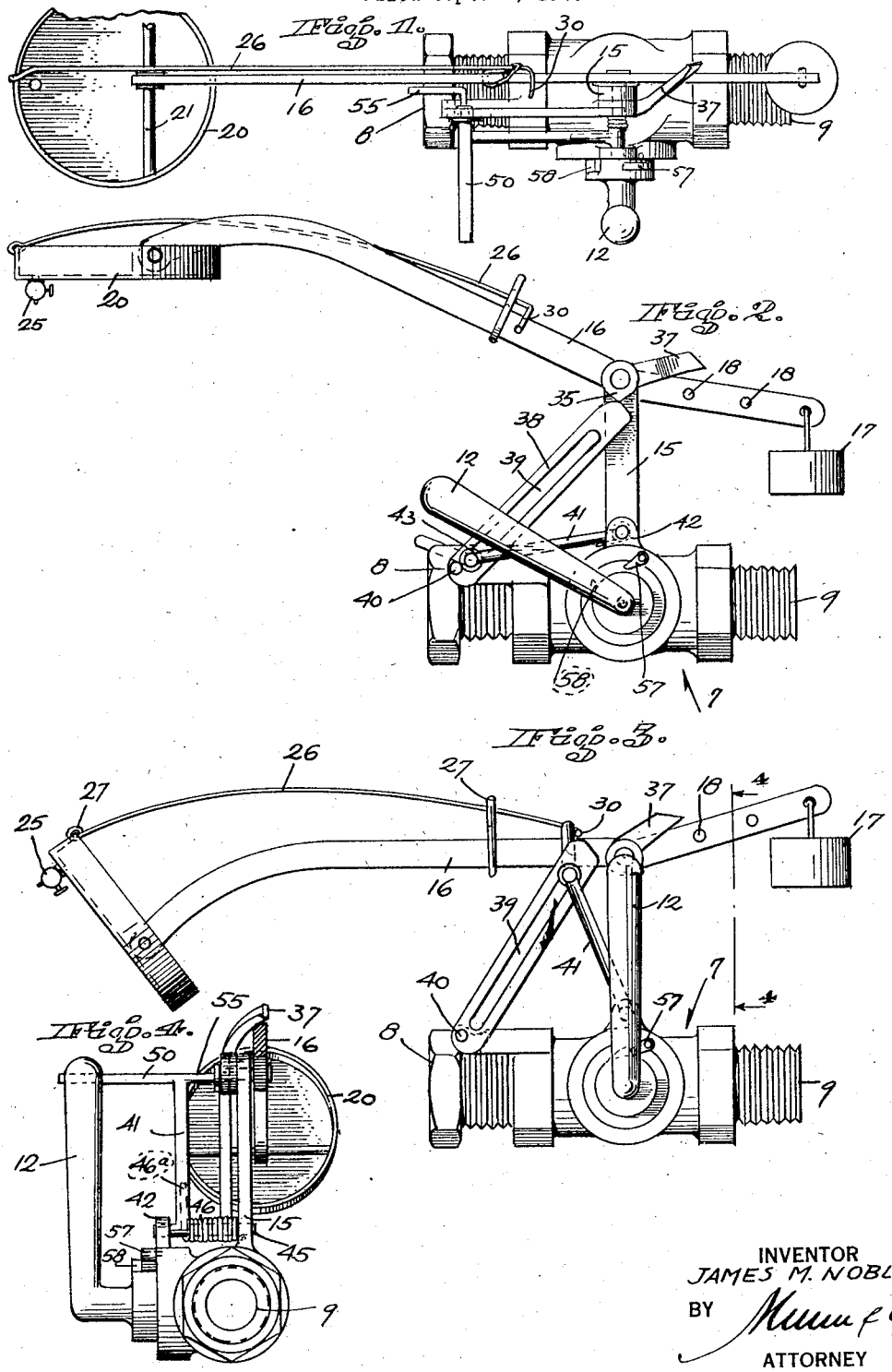

1,642,821

UNITED STATES PATENT OFFICE.

JAMES M. NOBLE, OF GUSTINE, CALIFORNIA.

AUTOMATIC SHUT-OFF DEVICE FOR LAWN SPRINKLERS.

Application filed September 8, 1926. Serial No. 134,297.

This invention relates to an automatic shut-off device for lawn sprinklers and it has for one of its objects the provision of a device of the character mentioned which may be adjusted to shut off the water supply to a sprinkler when a predetermined amount of water has been sprinkled.

With the foregoing object in view, together with such other objects and advantages as may subsequently appear, this invention resides in the construction and arrangement of parts hereinafter described and claimed, and illustrated in the accompanying drawings, in which Figure 1 is a plan view of the device, partly broken away;

Figure 2 is a side elevation of the same in open position;

Figure 3 is a side elevation of the device in closed position; and

Figure 4 is a view taken on line 4—4 of Figure 3.

Referring to the drawings for a more detailed description thereof, the numeral 7 indicates a valve which, at its ends 8 and 9, may be connected into a water line which feeds a lawn sprinkler. The valve may be turned on or off by movement of the arm 12. A bracket 15 is secured to the valve and rises therefrom and pivotally supports a lever 16 which is provided at one end with a counterweight 17 which may be adjusted along one arm of the lever by being hooked into any one of the apertures 18.

The left end of the lever 16 pivotally carries a vessel 20 which is adapted to catch water from a lawn sprinkler. It will be noted that the vessel 20 is circular and that it is eccentrically mounted on the lever 16 by an off-center bar 21 which passes thru its periphery at two points and which also passes thru the left end of the lever. The vessel 20 is provided at its bottom with a drainage valve 25, thru which the water, if desired, may be allowed to run off at a desired rate while water is falling into the vessel at a desired rate.

The vessel 20 may be tilted by movement to the right of a member 26 which is pivotally secured at one end to the wall of the vessel. The tilting member 26 is supported by a bracket 27 secured to the lever 16. The tilting member passes loosely through the bracket 27 so as to be slidable relative thereto.

To the right of the bracket 27 the tilting member is bent forwardly of the lever 16, forming an end portion 30.

An eccentric 35 is pivotally mounted on the bracket 15 and is integral with a tripping arm 37 which is bent backwardly over and above the right end portion of the lever 16.

When water is running thru the valve to the sprinkler the cam 35 is in contact with a member 38 which is provided with a slot 39, as shown in Figure 2. The slotted member 38 is pivotally mounted on the valve casing at 40. A rod member 41 is pivoted at one end to a bracket 42.

A pin 45 is mounted in the brackets 15 and 42, as clearly shown in Figure 4, and carries a coiled spring 46, fastened to it at one end.

The end portion 46ª of the spring is straight and is adapted to press upwardly against the member 41 which at its free end carries a member 50 adapted to contract with the handle 12 when the member 41 is raised by the spring, and thus shut off the water. The end of the member 41 also carries a member 55 which is adapted to contact with and throw to the right the portion 30 of the member 26 when the member 41 is raised by the spring 46; the vessel 20 is thus tipped and emptied.

As the handle 12 is moved to the vertical position shown in Figure 3, a pivoted dog 57 engages a notch 58 in the handle 12 and prevents the handle being thrown too far.

In the operation of the device, when the weight of the water in the vessel 20 is sufficient to tilt the lever, the latter hits the member 37 and therefore also the cam 35, so that the latter is disengaged from the member 38. The latter then moves to the left as shown in Figure 3, and leaves the member 41 free to be moved upward by the spring 46. The upward movement of the member 41 causes the member 50 to move the handle 12 to the position where it shuts off the water while the member 55 contacts with the portion 30 of the member 26 whereby the vessel 20 is emptied of water. It will thus be seen that the water to the sprinkler is automatically shut off when a predetermined amount of water has been distributed to it.

While I have described one embodiment of my invention, modifications thereof may be readily devised without departing from the spirit of my invention, and it is to be understood that such modifications come within the scope of the appended claims.

I claim:

1. A valve, first means for turning off the valve, a vessel for catching water from a sprinkler, and second means for actuating said first means when there is a predetermined amount of water in said vessel, said second means comprising a lever on one arm of which said vessel is tiltedly mounted, and on the other arm of which is an adjustably mounted weight, and automatic means for tilting said vessel to empty the same.

2. A valve, first means for turning off the valve, a vessel for catching water from a sprinkler, and second means for actuating said first means when there is a predetermined amount of water in said vessel, said second means comprising a lever on one arm of which said vessel is tiltedly mounted, and on the other arm of which is an adjustably mounted weight, said vessel being provided with an adjustable outlet, and automatic means for tilting said vessel to empty the same.

JAMES M. NOBLE.